(12) United States Patent
Adami

(10) Patent No.: US 8,963,704 B2
(45) Date of Patent: Feb. 24, 2015

(54) DRIVER ASSIST DEVICE FOR AN INDUSTRIAL TRUCK AND INDUSTRIAL TRUCK WITH DRIVER ASSIST DEVICE

(71) Applicant: Linde Material Handling GmbH, Aschaffenburg (DE)

(72) Inventor: Peter Adami, Leidersbach (DE)

(73) Assignee: Linde Material Handling GmbH, Aschaffenburg (DE)

( * ) Notice: Subject to any disclaimer, the term of this patent is extended or adjusted under 35 U.S.C. 154(b) by 35 days.

(21) Appl. No.: 13/948,200

(22) Filed: Jul. 23, 2013

(65) Prior Publication Data

US 2014/0159881 A1    Jun. 12, 2014

(30) Foreign Application Priority Data

Jul. 31, 2012    (DE) .......................... 10 2012 106 990

(51) Int. Cl.
   *B60Q 1/26*    (2006.01)
(52) U.S. Cl.
   USPC ............................. 340/463; 340/468; 362/549
(58) Field of Classification Search
   CPC ........................................................ B60Q 1/20
   USPC ...................... 340/425.5, 436, 437, 463, 468;
                                      362/485, 523, 549
   See application file for complete search history.

(56) References Cited

U.S. PATENT DOCUMENTS

| 3,934,134 | A | * | 1/1976 | Wassel .......................... 362/549 |
| 4,224,657 | A | * | 9/1980 | Olson ........................... 362/485 |
| 6,809,654 | B2 | * | 10/2004 | Hudson ......................... 340/907 |
| 7,016,765 | B2 | * | 3/2006 | Bellchambers ............... 700/214 |
| 8,763,759 | B2 | * | 7/2014 | Viereck et al. ................ 187/222 |
| 2007/0058380 | A1 | * | 3/2007 | Tajima et al. ................. 362/464 |

FOREIGN PATENT DOCUMENTS

| DE | 102006002960 A1 | 7/2007 |
| DE | 102007063226 A1 | 7/2009 |

* cited by examiner

*Primary Examiner* — Van T. Trieu
(74) *Attorney, Agent, or Firm* — The Webb Law Firm

(57) ABSTRACT

A driver assist device is provided for an industrial truck (1) that has a load handling device (5). The driver assist device, when located on the industrial truck (1), projects a lighting effect onto the roadway (13). The lighting effect forms a position marking (12) of the load handling device (5) on the roadway (13) which will be reached by the load handling device (5) for a particular steering angle after the industrial truck (1) travels around a curve by a defined curve angle.

17 Claims, 2 Drawing Sheets

DRIVER ASSIST DEVICE FOR AN INDUSTRIAL TRUCK AND INDUSTRIAL TRUCK WITH DRIVER ASSIST DEVICE

CROSS REFERENCE TO RELATED APPLICATION

This application claims priority to German Application No. 10 2012 106 990.5 filed Jul. 31, 2012, which is herein incorporated by reference in its entirety.

BACKGROUND OF THE INVENTION

1. Field of the Invention

This invention relates to a driver assist device for an industrial truck and to an industrial truck incorporating the driver assist device. In particular, the invention relates to a driver assist device for an industrial truck which, when located on an industrial truck, projects a lighting effect on the roadway.

2. Technical Considerations

It is known that a wide range of vehicles, e.g. buses, motor homes and trucks, can be equipped with a camera system to provide the driver with an overview during materials handling operations that is difficult or even impossible to achieve by means of mirrors or by direct sight. The use of camera systems on industrial trucks, in particular on counterbalance fork-lift trucks, is also known. DE 10 2007 063 226 A1 describes the superimposition of an image of the potential path of the vehicle (as a function of a steering angle) on the display of a camera image to indicate whether, at a particular steering angle, a potential obstacle is located in the path of the vehicle.

One disadvantage of this method of the known art is that the display from the camera does not provide a three-dimensional impression but only a significantly smaller image of the roadway and, therefore, is helpful only to a limited extent when approaching a position in a warehouse.

A typical problem that occurs very frequently in working with industrial trucks is that a significant distance must first be traveled to reach a warehouse position, and the industrial truck must be turned by 90° immediately in front of the warehouse position to orient the load handling means, such as a load fork, to the warehouse position or to a load that is stored there. The most frequent situation of this type is when loads are being picked up or set down on shelf systems using counterbalanced fork-lift trucks or reach trucks. In this case, the driver drives the vehicle along the shelf aisle until the vehicle is immediately in front of the warehouse position where the materials handling operation is to be performed. The driver must then turn the industrial truck by 90° with respect to the previous direction of travel to orient the load fork to the position of the shelf or the load. During this rotation, the driver must be able, on the basis of his or her own routine and experience, to orient the fork tines of the load fork so that they can be inserted into the corresponding openings of the pallet on which the load is stored at a particular location in the warehouse. If the vehicle is at an offset with respect to these openings and possible corrections, e.g. by means of a sideshifter device for the load forks, are not sufficient, the orientation must be corrected, if necessary by multiple maneuvers of the truck. This correction wastes time and so far can only be minimized and avoided by ensuring that the driver has enough practice and experience to efficiently correct the vehicle position.

DE 10 2006 002 960 A1 describes an industrial truck with an optical warning device in which a lighting effect that points in the direction of travel is projected onto the roadway to warn people in the vicinity of the approach of the industrial truck. However, this method serves only to warn against an approaching industrial truck and does not offer any assistance during maneuvering of the truck and the rolling on or off of a warehouse item.

Therefore, an object of the invention is to provide a driver assist device for an industrial truck as well as an industrial truck and a system with which it is possible to more easily and accurately approach a warehouse position on a curve and to eliminate the disadvantages described above.

SUMMARY OF THE INVENTION

A driver assist device is provided for an industrial truck having a load-handling device. The driver assist device, when located on the industrial truck, projects a lighting effect on the roadway. The lighting effect forms a position marking (image) of the load handling device on the roadway which will be reached by the load handling device for a particular steering angle after the industrial truck travels in a curve at a defined curve angle.

For example, the particular steering angle can be a fixed steering angle, such as the maximum steering angle. Alternatively, the particular steering angle can be the instantaneous steering angle, such as determined by the steering wheel of the industrial truck.

The industrial truck travels curved paths that have different radii as a function of a steering angle. The position marking indicates the point at which the load handling device will be after traveling at a defined curve angle on the curved path at a radius which is defined by the steering angle. For example, the traversal of a curve angle of 90° means that the industrial truck rotates with reference to its longitudinal axis by 90° and makes a quarter-turn on the curved path. If, for example, a driver with an industrial truck which is equipped with the driver assist device approaches the vicinity of a warehouse position in an aisle of shelves to pick up a pallet which is stored on the shelf, the industrial truck must be rotated around a curve angle of 90° at a right angle to the aisle of shelves. The driver assist device of the invention makes it possible for the driver to easily detect visually where the load handling device, such as a load fork, will then be located. Before the truck enters the curve, the driver can therefore orient the industrial truck so that after the curve, the load fork will be in the correct position to pick up the pallet and no further corrections are necessary, or only minor corrections by means of an optionally provided sideshifting device of the load handling device will be sufficient. It is thereby conceivable to set the driver assist device to a fixed steering angle, such as the maximum steering angle. In that case, the industrial truck is moved along the shelf until the position marking is at the correct location, the maximum steering angle is assumed and in the subsequent travel on a curve the load handling device arrives exactly in this position. Alternatively, the position marking for the instantaneous steering angle can be displayed. In that case, the orientation can be accomplished by a variation of the steering angle as well as by moving the industrial truck. A signal that reflects the instantaneous steering angle must therefore be transmitted to the driver assist device. The steering angle can be measured by methods and devices, in particular sensors, which are sufficiently known from the known art. As a result of the driver assist device of the invention, no corrections of the orientation of the industrial truck at a right angle to a load to be picked up are necessary, which results in a significant saving of time.

The driver assist device can be a compact, self-contained device, and in particular if the maximum steering angle can be used as a steering angle, the driver assist device can be easily retrofitted on existing industrial trucks. The driver assist device enables drivers who do not yet have much driving practice and experience to approach warehouse positions in a time-saving manner. A frequent application consists of curve angles of 90°, when a warehouse position in a series of warehouse spaces is approached and the truck must then be oriented to this warehouse position. However, the invention can also be used for all other conceivable curve angles that may result from the conditions and modes of use in a warehouse.

The lighting effect advantageously includes a position image or marking which indicates the orientation of the load handling device. In particular, by making clear an angular orientation, such as by lines that correspond to the fork tines of the fork, the driver can easily determine whether the load handling device will be in the correct position after the curve.

In one advantageous configuration of the invention, the position marking represents a schematic outline of the load handling device. By displaying a schematic outline, it becomes possible to portray, among other things, different load handling devices that can optionally be used interchangeably on the same industrial truck. For example, a distinction can be made between a load fork, a paper roll clamp, a bale clamp, or another similar accessory for load handling, and a driver can always see whether the orientation is correct for the warehouse position the truck is approaching.

The lighting effect can be produced by a bundled light beam of a corresponding light source. The lighting effect can be produced by a laser. Lasers are available economically and make possible a good visible reproduction of the image of a line on the roadway, such as in the form of the outline of the load handling device.

This object is also accomplished by an industrial truck with a load handling device and a driver assist device described above, in which the lighting effect marks a position marking of the load handling device on the roadway which is reached by the load handling device for a particular steering angle after the industrial truck travels through a curve by a defined curve angle.

The industrial truck with the driver assist device has the advantages described above. The position marking can be projected simultaneously on both sides of the industrial truck or the driver can select on which side a position marking is to be projected.

In one configuration of the invention, the position marking for the maximum steering angle can be displayed. This feature makes possible a particularly simple and economical realization and does not require a signal from the vehicle control system of the industrial truck, such as a steering angle.

In one development of the invention, the position marking for the instantaneous steering angle can be displayed.

It thereby becomes possible for the position marking to track the instantaneous steering angle. The orientation can be corrected before the vehicle enters the curve by forward and reverse movement of the industrial truck by the traction drive as well as by an adjustment of the steering angle, such as via a steering wheel. It is thereby conceivable to mark, in addition to the position marking for the instantaneous steering angle, the position marking for a maximum steering angle.

If a sideshifting device is provided for the load handling device, in one development of the invention the position marking can track the position of the sideshifting device. It thereby becomes possible to have the position marking automatically track a change in the position of the sideshifting device of the load handling device when the sideshifting device is actuated.

The specified curve angle is advantageously 90°. This angle corresponds to the most frequent application when an industrial truck approaches a warehouse position in a shelf aisle, and in the shelf aisle, the industrial truck must be placed at a right angle to pick up or set down a load.

In one configuration of the invention, the driver assist device can be turned on by a steering angle which exceeds a defined minimum steering angle and/or if the speed of the industrial truck falls below a minimum speed and/or by actuating a hydraulic function of the industrial truck.

If the driver assist device is actuated automatically, it does not pose an annoyance during normal operation of the industrial truck. The driver assist device can be actuated, for example, if the steering angle exceeds a specified minimum steering angle, such as when the industrial truck is traveling at a very sharp steering angle. That can be the case at least when an industrial truck must be positioned at a right angle in an extremely limited area in a shelf aisle or if it must approach a warehouse position during maneuvering. It is thereby also possible to define by the direction of the steering angle the side of the industrial truck on which the position marking is to be projected. Alternatively or simultaneously, the driver assist device can be turned on if the speed of the vehicle drops below a minimum speed, as is the case, for example, after approaching the storage position during deceleration in a shelf aisle. Because the load handling device must be actuated to pick up or set down a load, for example, by adjusting the height of the load handling device, the driver assist device can be efficiently automated by actuating a hydraulic device.

The driver assist device can be turned on by means of a switch. It is therefore possible to ensure that the driver assist device is not operating continuously in a manner that could be perceived as irritating or unpleasant. The load handling device is advantageously a load fork. Especially during the pick up of transport pallets by the fork tines of a load fork, the correct orientation is very important and the driver assist device of the invention, and an industrial truck equipped with such a device, are particularly advantageous.

However, the invention can also be used on other load handling devices that are installed on a lifting mast, such as a bale clamp, roll clamp, or a grabber, for example.

In one advantageous configuration of the invention, the industrial truck has a protective roof over the driver station and the driver assist device has a light source for the lighting effect located in the upper area of the protective roof over the driver station.

The protective roof over the driver station offers a position in a high location which makes it easier to display the position marking on the roadway.

The industrial truck can have a lifting mast and the driver assist device can have a light source for the lighting effect located in the upper area of the lifting mast.

Especially on industrial trucks that do not have a tilting lifting mast, a location as described above is advantageous and presents an opportunity for a high placement of the driver assist device. That can be the case, for example, on high-lift pallet-trucks, reach trucks, order pickers, in particular horizontal order pickers or vertical order pickers, swing fork-lift trucks and high-level stackers.

The object of the invention is also accomplished by a system comprising a shelf storage warehouse and at least one industrial truck of the type described above on which the load handling device is guided on a mast. On the roadway in front of the warehouse shelf, markings are applied to orient the position marking for storage spaces located on the higher shelves.

Permanent markings of this type on the floor, which can be colored markings, for example, can facilitate the approach to a warehouse position on a higher-level shelf By superimposing the position marking on a marking of this type, the load handling device is simultaneously oriented laterally, so that a storage position located above it can be approached by the subsequent raising of the load handling device in the higher-level shelf.

BRIEF DESCRIPTION OF THE DRAWINGS

Additional advantages and details of the invention are explained in greater detail below with reference to the exemplary embodiment illustrated in the accompanying schematic figures, in which like reference numbers identify like parts throughout.

DESCRIPTION OF THE PREFERRED EMBODIMENTS

Figure 1:
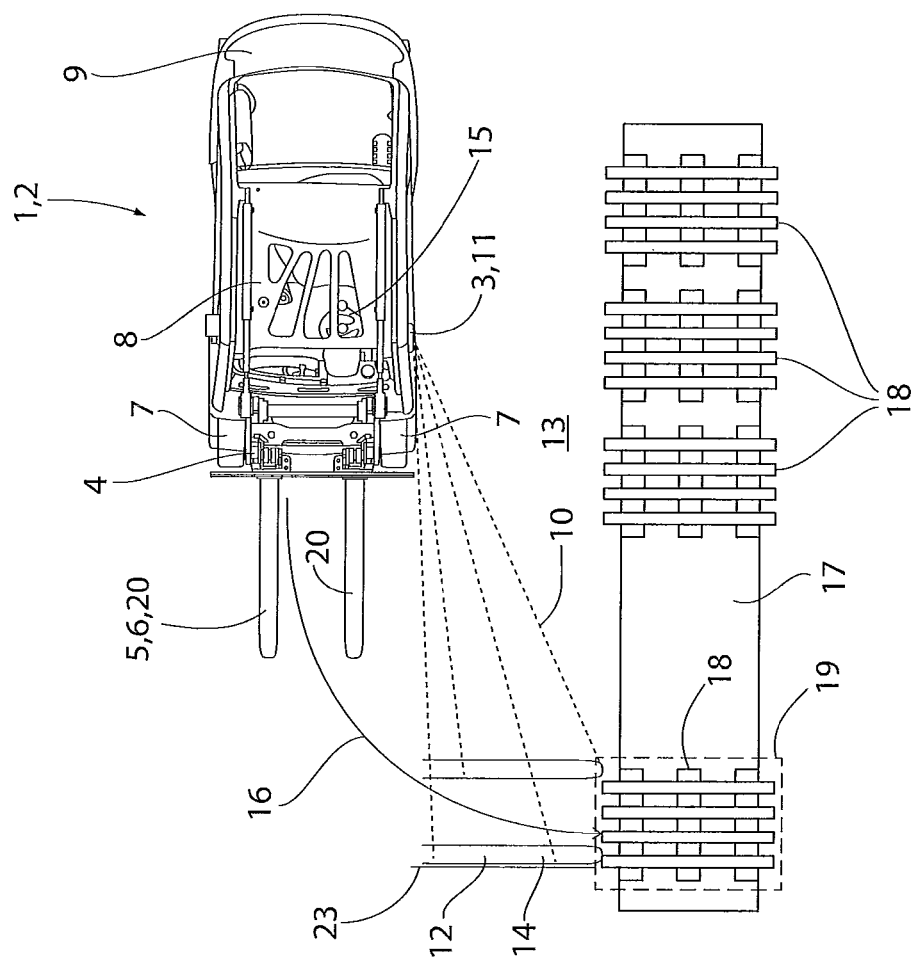
FIG. 1 is a plan view of an industrial truck with a driver assist device of the invention.

FIG. 1 shows a schematic illustration in plan view of an industrial truck 1, in the form of a counterbalance fork-lift truck 2, with a driver assist device 3. The counterbalance fork-lift truck 2 has a load handling device 5 in the form of a load fork 6 which is formed by two fork tines and is guided on a lifting mast 4. The lifting mast 4 is located above a forward axle with forward wheels 7 by which the counterbalance fork-lift truck 2 is driven. Behind the lifting mast 4 is a protective roof 8 over the driver station and behind the protective roof 8 is a counterbalance 9 (counterweight). Below the counterbalance 9, and not shown in FIG. 1, are steered rear wheels with which the counterbalance fork-lift truck 2 is steered. The driver assist device 3 is located, for example, on the protective roof 8 over the driver station and emits laser light 10 from a laser 11 or bundled light from a light source as a lighting effect, by which a position marking 12 is formed on the roadway 13. The position marking 12 corresponds to a schematic outline 14 of the load fork 6. When the counterbalance fork-lift truck 2 is moved from the illustrated position at a selected steering angle of the rear wheels, which corresponds to a steering angle of a steering wheel 15, and traverses a quarter-turn, corresponding to a curve angle of 90° and a rotation of the vehicle axle by 90° as indicated by the arrow 16, the load fork 6 coincides with the position marking 12.

In the illustrated position of the counterbalance fork-lift truck 2, a shelf 17 on which pallets 18 have been set down is located next to the counterbalance fork-lift truck 2. The illustrated position marking 12 that corresponds to the instantaneous steering angle of the steering wheel 15 is located in the illustration adjacent a pallet 18, which corresponds to a warehouse position 19. For the driver of the counterbalance fork-lift truck 2 which is approaching the warehouse position 19 parallel to the load shelf 17, it is therefore apparent whether the instantaneous steering angle of the steering wheel 15 of the counterbalance fork-lift truck 2 would be in the correct position with respect to the pallet 18 in the warehouse position 19 after traversing a quarter-turn to be able to insert the fork tines 20 of the load fork 6 into the corresponding openings of the pallet 18. To correct the orientation, the driver can move the counterbalance fork-lift truck 2 using the traction drive system parallel to the load shelf 17. In addition or alternatively, the position marking 12 can be shifted by changing the steering angle on the steering wheel 15 until the orientation with respect to the warehouse position 19 and the corresponding pallet 18 is correct.

Figure 2:
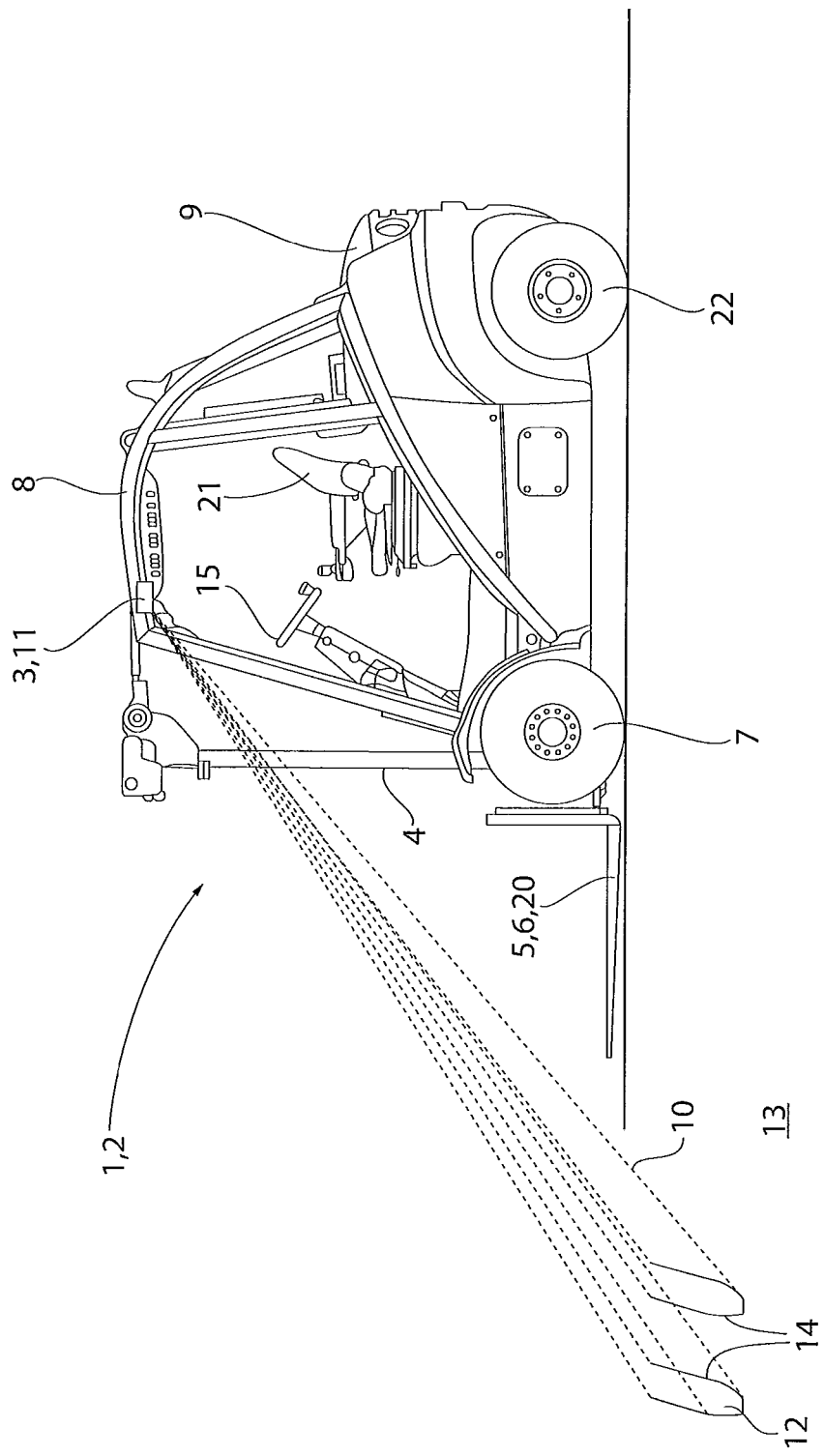
FIG. 2 is a side view of the industrial truck illustrated in FIG. 1.

FIG. 2 is a side view of the counterbalance fork-lift truck 2 of the invention and illustrated in FIG. 1. The driver assist device 3 is fastened to the side of the protective roof 8 above the driver station. The load handing device 5, in the form of the load fork 6, is guided on the lift mast 4, which is above the driven front wheels 7. A driver's seat 21 and the steering wheel 15 are located below the protective roof 8. Steered rear wheels 22 are located below the counterbalance 9. The laser 11 of the driver assist device 3 emits laser light 10, which forms the position marking 12 on the roadway 13, in this example in the form of a schematic outline 14.

A marking 23 (see FIG. 1) applied to the roadway 13, in this case a bar marking the right side of the position marking 12, makes it possible to first orient the load fork 6 for a warehouse position to an upper shelf compartment and, after the load fork 6 has made its approach and been raised, to pick up a pallet 18.

As soon as the counterbalance fork-lift truck 2 decelerates below a minimum speed and the steering wheel 15 is turned beyond a specified minimum angle from the straight-ahead position, the laser 11 of the driver assist device 3 is automatically turned on for as long as the steering angle is maintained. The position marking 12 is displayed according to the instantaneous steering angle on the side of the counterbalance fork-lift truck 2 toward which the vehicle is being steered. It is therefore quickly and intuitively apparent to the driver where the load fork 6 will move as the truck continues to travel, and in what orientation with respect to the warehouse position 19 the load fork 6 will come to rest after the quarter-turn. The steering angle of the steered rear wheels 22 or of the steering wheel 15 can be determined by any methods and devices known in the art, in particular by sensors, and fed to the driver assist device 3. The elevated position of the driver assist device 3 on the protective roof 8 above the driver station makes possible an accurate and clear image of the position marking 12.

The invention is not limited to the example described and illustrated here of a counterbalance fork-lift truck 2 as the industrial truck 1, and can be used on all types of industrial trucks on which load handling means must be oriented when they reach a warehouse position after traveling on a curve.

It will be readily appreciated by those skilled in the art that modifications may be made to the invention without departing from the concepts disclosed in the forgoing description. Accordingly, the particular embodiments described in detail herein are illustrative only and are not limiting to the scope of the invention, which is to be given the full breadth of the appended claims and any and all equivalents thereof.

The invention claimed is:

1. A driver assist device for an industrial truck having a load handling device, comprising:
   a light source configured to project a lighting effect on a roadway, wherein the lighting effect forms a position marking of at least a portion of a load handling device on the roadway reached by the load handling device for a particular steering angle of the industrial truck after the industrial truck travels around a curve at a defined curve angle.

2. The driver assist device as recited in claim 1, wherein the lighting effect includes a position marking showing an orientation of the load handling device of the industrial truck.

3. The driver assist device as recited in claim 2, wherein the position marking is a schematic outline of at least a portion of the load handling device.

4. The driver assist device as recited in claim 1, wherein the light source is a laser.

5. The driver assist device as recited in claim 1, wherein the particular steering angle is selected from the group consisting of a maximum steering angle of the industrial truck and an instantaneous steering angle of the industrial truck.

6. An industrial truck, comprising:
   a load handling device; and
   a driver assist device comprising a light source configured to project a lighting effect on a roadway, wherein the lighting effect forms a position marking of at least a portion of the load handling device on the roadway reached by the load handling device for a particular steering angle of the industrial truck after the industrial truck travels around a curve at a defined curve angle.

7. The industrial truck as recited in claim 6, wherein the position marking is for a maximum steering angle of the industrial truck.

8. The industrial truck as recited in claim 6, wherein the position marking is for an instantaneous steering angle of the industrial truck.

9. The industrial truck as recited in claim 6, wherein the defined curve angle is 90°.

10. The industrial truck as recited in claim 6, wherein the driver assist device is activated by at least one of a steering angle that exceeds a defined minimum steering angle, when the industrial truck drops below a minimum speed of travel, or by actuation of a hydraulic device of the industrial truck.

11. The industrial truck as recited in claim 6, wherein the driver assist device is activated by a switch.

12. The industrial truck as recited in claim 6, wherein the load handling device is a load fork.

13. The industrial truck as recited in claim 6, wherein the industrial truck has a protective roof over a driver station and the driver assist device light source for the lighting effect is located in an upper area of the protective roof.

14. The industrial truck as recited in claim 6, wherein the industrial truck includes a lifting mast and the driver assist device light source for the lighting effect is located in an upper area of the lifting mast.

15. The industrial truck as recited in claim 6, wherein the particular steering angle is selected from the group consisting of a maximum steering angle of the industrial truck and an instantaneous steering angle of the industrial truck.

16. A system comprising:
   a storage rack;
   at least one industrial truck comprising a load handling device and a driver assist device having a light source configured to project a lighting effect on a roadway, wherein the lighting effect forms a position marking of at least a portion of the load handling device on the roadway reached by the load handling device for a particular steering angle of the industrial truck after the industrial truck travels around a curve at a defined curve angle, wherein the load handling device is guided on a lifting mast; and
   markings located on the roadway in front of the storage rack for orientation of the position marking for storage spaces located on upper shelf compartments.

17. The system as recited in claim 16, wherein the particular steering angle is selected from the group consisting of a maximum steering angle of the industrial truck and an instantaneous steering angle of the industrial truck.

* * * * *